US009847004B1

(12) United States Patent
Lan et al.

(10) Patent No.: US 9,847,004 B1
(45) Date of Patent: Dec. 19, 2017

(54) VEHICLE CHILD DETECTION AND RESPONSE SYSTEM

(71) Applicant: Atieva, Inc., Menlo Park, CA (US)

(72) Inventors: Qing Lan, Menlo Park, CA (US); Honglu Zhang, Fremont, CA (US)

(73) Assignee: ATIEVA, INC., Menlo Park, CA (US)

( * ) Notice: Subject to any disclaimer, the term of this patent is extended or adjusted under 35 U.S.C. 154(b) by 0 days.

(21) Appl. No.: 15/255,587

(22) Filed: Sep. 2, 2016

(51) Int. Cl.
*H04Q 1/08* (2006.01)
*G08B 21/02* (2006.01)

(52) U.S. Cl.
CPC ..... *G08B 21/0263* (2013.01); *G08B 21/0283* (2013.01); *G08B 21/0277* (2013.01)

(58) Field of Classification Search
CPC ............ G08B 21/0263; G08B 21/0283; G08B 21/0277
USPC .......................................................... 340/532
See application file for complete search history.

(56) References Cited

U.S. PATENT DOCUMENTS 6,220,627 B1 * 4/2001 Stanley ................. B60R 21/015 180/272
7,466,217 B1 * 12/2008 Johnson ................. B60N 2/002 180/268
8,892,302 B1 * 11/2014 McDonald ............. G08B 21/24 701/36
9,403,437 B1 * 8/2016 McDonald ............. B60K 37/02
2003/0201894 A1 * 10/2003 Li .......................... B60N 2/002 340/573.1
2003/0222775 A1 * 12/2003 Rackham ............ B60R 25/1004 340/457
2006/0062472 A1 * 3/2006 Engelberg .......... G06K 9/00335 382/190
2007/0052529 A1 * 3/2007 Perez ..................... B60N 2/002 340/457
2007/0090938 A1 * 4/2007 Donaldson ............. B60N 2/002 340/457
2007/0182532 A1 * 8/2007 Lengning ............. G10H 1/0041 340/439
2011/0241867 A1 * 10/2011 Neal ...................... B60N 2/002 340/457
2013/0049946 A1 * 2/2013 Chavez .................... B60Q 1/00 340/457
2013/0201013 A1 * 8/2013 Schoenberg ............ B60R 22/48 340/438
2014/0043155 A1 * 2/2014 Shaw ....................... B60Q 9/00 340/457
2014/0297133 A1 * 10/2014 Oikawa .................. B60N 2/002 701/45

(Continued)

*Primary Examiner* — Ojiako Nwugo
(74) *Attorney, Agent, or Firm* — Patent Law Office of David G. Beck

(57) ABSTRACT

A sensor system is provided that is incorporated into the passenger cabin of a vehicle and which is configured to detect children and/or pets left unattended and who are therefore at risk of serious injury or death due to heat stroke. The system is designed to transmit a variety of alerts over time after an unattended child or pet is detected, the escalating nature of the alerts intended to insure a rapid response. After the system has operated long enough to insure that no child or pet has been left behind, the sensor system is automatically placed into a standby mode. In standby mode the sensor system may either be turned completely off in order to minimize off-line power consumption or it may be incorporated into an on-board security system.

20 Claims, 14 Drawing Sheets

(56) References Cited

U.S. PATENT DOCUMENTS

| | | | | |
|---|---|---|---|---|
| 2015/0332578 | A1 * | 11/2015 | Borgne .................... | B60N 2/26<br>340/667 |
| 2016/0042616 | A1 * | 2/2016 | Dorsey .................. | G08B 21/24<br>340/457 |

* cited by examiner

VEHICLE CHILD DETECTION AND RESPONSE SYSTEM

FIELD OF THE INVENTION

The present invention relates generally to a passenger detection system for use in a vehicle and, more particularly, to a system that automatically detects a child left unattended in a vehicle and performs a suitable response when an unattended child is detected.

BACKGROUND OF THE INVENTION

In general, there is a lack of awareness as to how quickly the temperature can rise in a closed vehicle, or even in a vehicle in which the windows have been left slightly ajar. For example, on a day with an ambient temperature of 84° F., the temperature within the passenger cabin of a car can reach 104° F. in just 10 minutes. Even at a relatively cool outside temperature of 74° F., a vehicle's interior temperature can reach 104° F. in 20 minutes. As a result of these temperatures, a child or a pet left in an unattended vehicle for even a short period of time can suffer from heat stroke related symptoms, and in those cases in which relief is not provided immediately, the child or pet is likely to die from heat stroke. In the United States, heat stroke is the third most common non-traffic, motor-vehicle-related fatality scenario for children 14 and younger, on average accounting for 37 fatalities every year. Of these fatalities, 53.9% of the children were "forgotten" by caregivers, 28.6% of the children were playing in an unattended vehicle, and 16.8% of the children were intentionally left in a vehicle by an adult. Additionally, it is estimated that hundreds of pets die each year from heat stroke when left unattended in a car.

To combat this problem, communities and governmental agencies have implemented a variety of outreach programs. The intent of these programs is to educate the public as to the dangers of leaving a child or a pet unattended in a vehicle for even a short period of time. While these public awareness programs have proven helpful, the significant number of both child and pet fatalities that continue to occur demonstrate the need for additional remedies, in particular remedies that can be used to reliably detect the presence of a child, or pet, left unattended in a parked car and then take appropriate action when such a situation is detected. The present invention provides a solution to this problem, both in terms of a detection system and a methodology.

SUMMARY OF THE INVENTION

The present invention provides a child/pet detection system that is incorporated into a vehicle, the system comprising (i) a radar sensor mounted within the vehicle's passenger cabin (e.g., to the cabin's headliner) that is configured to detect motion within the passenger cabin; (ii) a monitoring system that outputs a first control signal when the driver exits the passenger cabin and a second control signal when the driver re-enters the passenger cabin; (iii) an alert system configured to output an alert, where the alert utilizes an alert mode selected from a plurality of alert modes; and (iv) a control system coupled to the radar sensor, the monitoring system and the alert system, the control system configured to (a) activate the radar sensor when the control system receives the first control signal, (b) monitor the radar sensor for a preset period of time (e.g., less than 30 minutes) after receipt of the first control signal, (c) activate the alert system when the radar sensor detects motion within the passenger cabin during the preset period of time, (d) select the alert mode, (e) alternate the selected alert mode over time, and (f) deactivate the alert system upon receipt of the second control signal.

In one aspect of the invention, the system may further include a heating, ventilation and air conditioning (HVAC) system that is coupled to the control system. The control system may be configured to activate the HVAC system after the radar sensor detects motion within the passenger cabin during the preset time.

In another aspect of the invention, a timer may be coupled to the control system, wherein the control system alternates the selected alert mode based on the elapsed time since alert system activation. A HVAC system may be coupled to the control system and the control system may be configured to activate the HVAC system after the elapsed time exceeds a preselected time period.

In another aspect of the invention, an in-cabin temperature sensor may be coupled to the control system, wherein the control system alternates the selected alert mode based on the monitored in-cabin temperature. A HVAC system may be coupled to the control system and the control system may be configured to activate the HVAC system after the monitored in-cabin temperature exceeds a preset temperature.

In another aspect of the invention, the control system may be configured to place the radar sensor into a standby mode if it does not detect motion during the preset period of time. In standby mode, the radar sensor may be deactivated or incorporated into the vehicle's on-board security system. If incorporated into the vehicle's on-board security system, the control system may be configured to activate an alarm when the radar sensor detects motion after the preset period of time has elapsed.

In another aspect of the invention, the plurality of alert modes may include at least one externally audible alarm and at least one externally visible alarm. The alert system may include a wireless telecommunications link and the plurality of alert modes may include a pre-recorded message (e.g., a pre-recorded text message or a pre-recorded audible message) that is transmitted by the alert system using the wireless telecommunications link. The system may include a wireless telecommunications link and an in-cabin camera, and the alert system may transmit a current image of the passenger cabin using the wireless telecommunications link when the radar sensor detects motion within the passenger cabin.

In another aspect of the invention, a vehicle status sensor may be coupled to the control system and the control system may be configured to activate the radar sensor when it receives the first control signal from the monitoring system and the vehicle off control signal from the vehicle status sensor.

In another aspect of the invention, the monitoring system may include at least one sensor (e.g., a pressure-based sensor, a capacitance-based sensor) integrated into the vehicle's driver seat, where the monitoring system outputs the first control signal when the driver exits the driver seat and outputs the second control signal when the driver sits on the driver seat.

In another aspect of the invention, the monitoring system may include a short range wireless identification system, where the monitoring system outputs the second control signal when the short range wireless identification system identifies a device (e.g., a key fob) with a unique user identifier and determines that the device is within the passenger cabin, and where the monitoring system outputs the first control signal when the wireless identification system determines that the device is outside of the passenger cabin.

In another aspect of the invention, the system may include a system over-ride switch. If the over-ride switch is activated, the control system will not activate the radar sensor. If the alert system is already activated, activation of the over-ride switch will deactivate the alert system. The system over-ride switch may be comprised of at least one sensor (e.g., a pressure-based sensor, a capacitance-based sensor) integrated into the driver seat, where sitting on the driver seat will activate the system over-ride switch. If the system over-ride includes a pressure-based sensor, the system may utilize a cut-off weight such that the over-ride switch is only activated if the pressure applied to the at least one pressure-based sensor is greater than the cut-off weight.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, similarly, a first step could be termed a second step, similarly, a first component could be termed a second component, all without departing from the scope of this disclosure.

Figure 1:
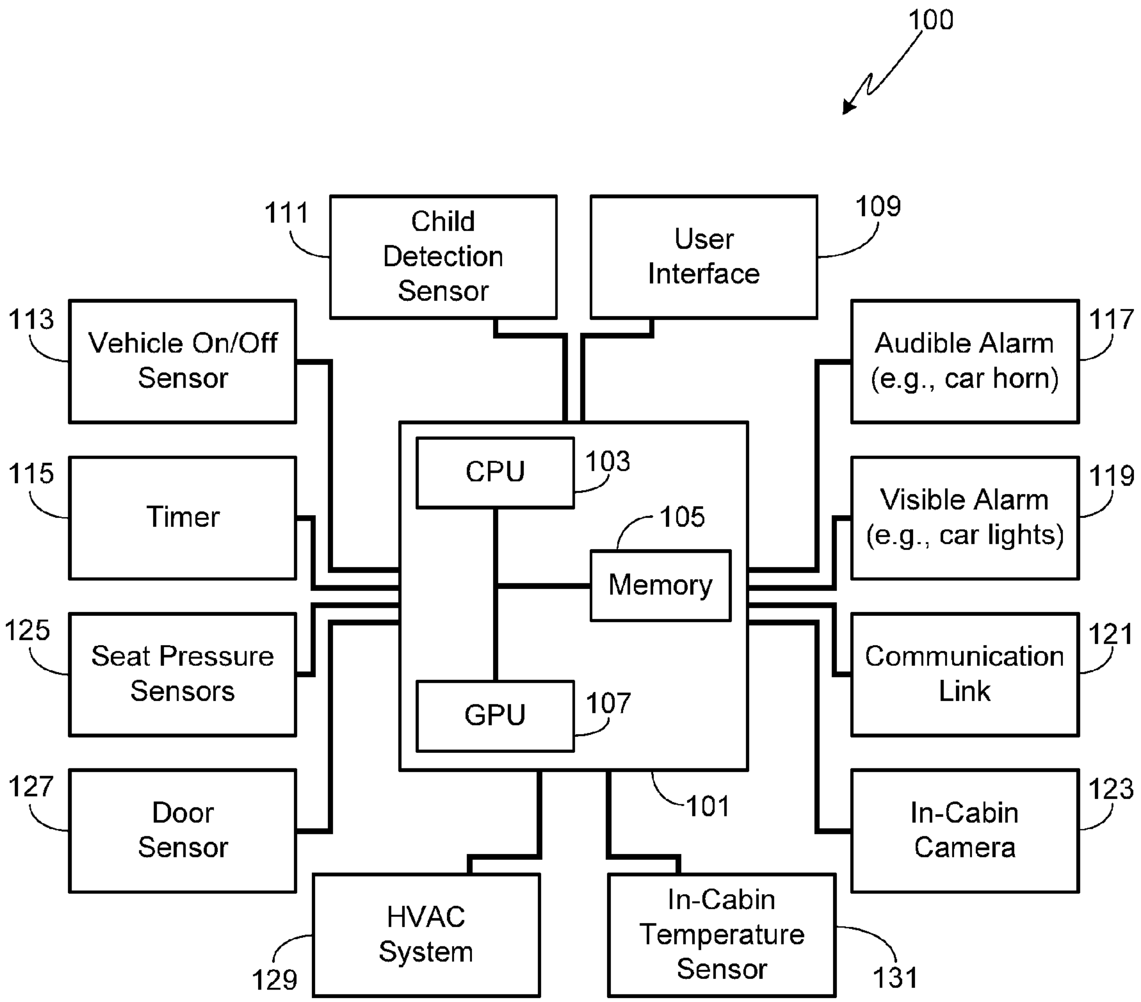
FIG. 1 provides a system level diagram of the primary vehicle systems utilized in at least one preferred embodiment of the invention.

FIG. 1 provides a block diagram of an exemplary detection and response system 100 for use with a preferred embodiment of the invention. System 100 may be integrated into an electric vehicle (EV), a vehicle utilizing an internal combustion engine (ICE), or a hybrid vehicle, where a hybrid vehicle utilizes multiple sources of propulsion including an electric drive system. It should be understood that control system 100 is but one possible configuration and that other configurations may be used while still retaining the functionality of the invention. For example, not every embodiment of the invention will necessarily use the external lights and/or the horn in responding to the detection of an unattended child or pet. Additionally, one or more of the elements shown in FIG. 1 can be grouped together in a single device, and/or circuit board, and/or integrated circuit.

Control system 100 includes a system controller 101 comprised of a central processing unit (CPU) 103 and a memory 105. Preferably system controller 101 also serves as the vehicle's management system (i.e., vehicle system controller). Memory 105 may be comprised of EPROM, EEPROM, flash memory, RAM, a solid state disk drive, a hard disk drive, or any other memory type or combination of memory types. Assuming a user interface 109 that includes a display, and depending upon the type of display used in the interface as well as the capabilities of CPU 103, controller 101 may also include a graphical processing unit (GPU) 107. CPU 103 and GPU 107 may be separate or contained on a single chip set.

As noted above, preferably an interface 109 is coupled to controller 101. The interface may be comprised of a single interface, for example a touch-screen display, or a combination of user interfaces such as push-button switches, capacitive switches, slide or toggle switches, gauges, display screens, warning lights, audible warning signals, etc. Interface 109 allows the driver, or a passenger, to interact with the vehicle management system, for example inputting data into the navigation system, altering the heating, ventilation and air conditioning (HVAC) system, controlling the vehicle's entertainment system (e.g., radio, CD/DVD player, etc.), adjusting vehicle settings (e.g., seat positions, light controls, etc.), and/or otherwise altering the functionality of the vehicle. Typically interface 109 also provides a way for the vehicle management system to communicate information to the driver and/or passenger, information such as a navigation map or driving instructions as well as the operating performance of any of a variety of vehicle systems (e.g., battery pack charge level for an electric car, fuel level for the engine in a hybrid or ICE-based vehicle, selected gear, current entertainment system settings such as volume level and selected track information, external light settings, current vehicle speed, current HVAC settings such as cabin temperature and/or fan settings, etc.). Interface 109 may also be used to communicate an operating system malfunction (battery system not charging properly, low oil pressure for an ICE-based vehicle, low tire air pressure, etc.).

Coupled to controller 101 is a sensor 111 that is used to determine whether a child, or pet, is still in the car after the car has been placed in park and the driver has left the vehicle. The present invention may be configured to utilize any of a variety of different types of sensors 111, alone or in combination. Preferably sensor(s) 111 is a pulse Doppler radar-based sensor, also referred to herein as an interior radar sensor. The inventors have found that this type of sensor can reliably detect the small amount of movement associated with the breathing of an infant, small child or pet, even if the child is covered with several layers of covers. While interior radar sensors are preferred, it should be understood that the invention may utilize a variety of transducer types, e.g., electromagnetic transducers, ultrasonic transducers, etc., to detect the presence of an unattended child or pet; that these transducers may emit a continuous signal, a time varying signal or a spatially varying signal; and that these transducers may use separate transmitters and receivers or they may use transceivers that are capable of both transmitting and receiving the monitor signal. While the invention may also utilize sensors incorporated into the vehicle seats (e.g., pressure or capacitive sensors), the inventors have found that these types of sensors are less reliable than a transducer-based sensor for the present application since seat-based sensors are prone to false signals, for example if an inanimate object (e.g., child seat) is left in the vehicle seat and the system has not been properly calibrated to compensate for the inanimate object.

Figure 2:
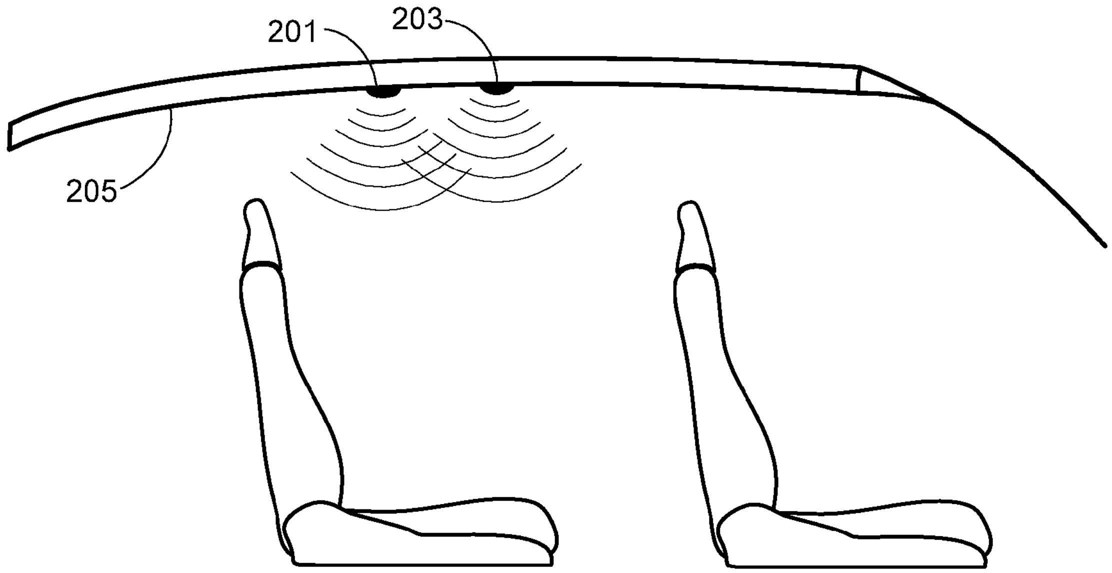
FIG. 2 provides a side view of a pair of sensors mounted in the vehicle's headliner.
Figure 3:
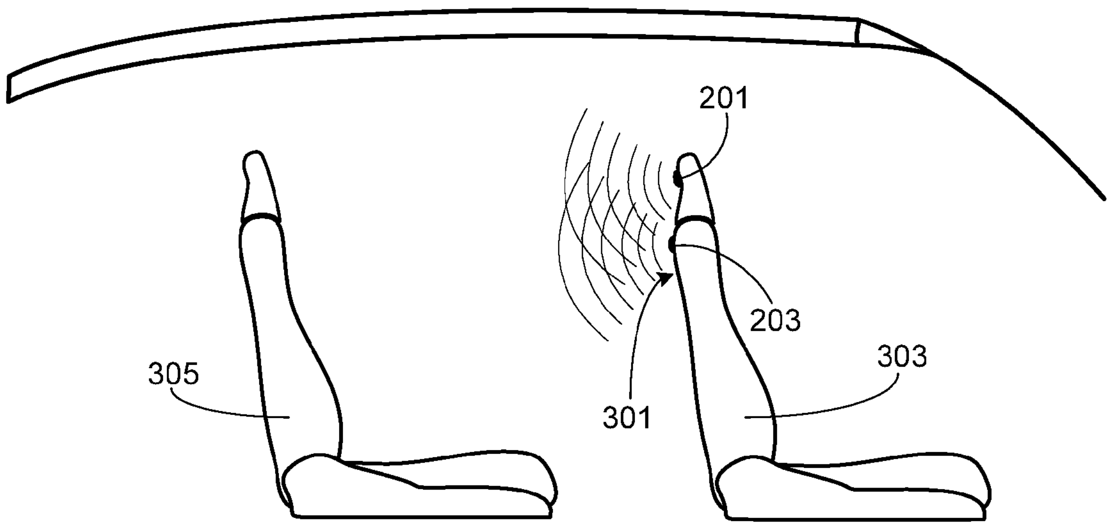
FIG. 3 provides a side view of a pair of sensors mounted in the back of an adjacent seat.
Figure 4:
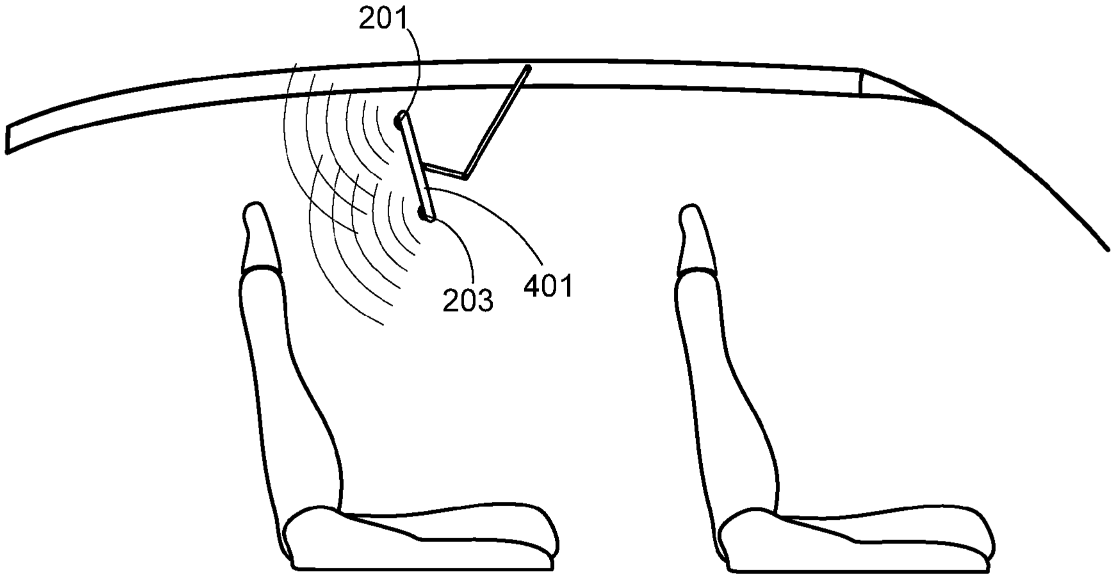
FIG. 4 provides a side view of a pair of sensors mounted in a headliner mounted display.
Figure 5:
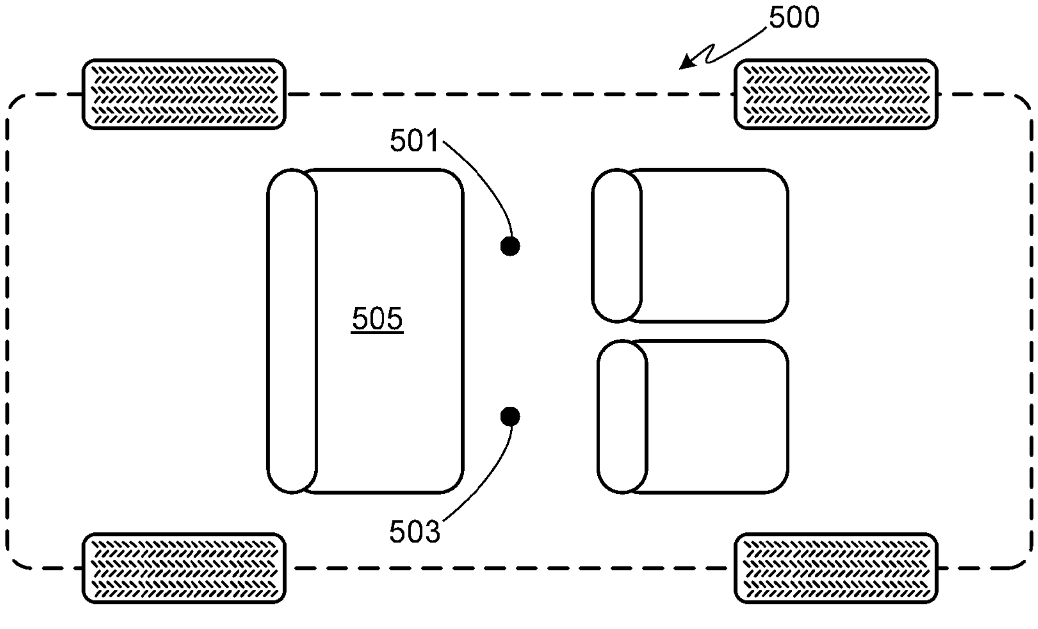
FIG. 5 provides a top view of a pair of sensors mounted in the vehicle's headliner.
Figure 6:
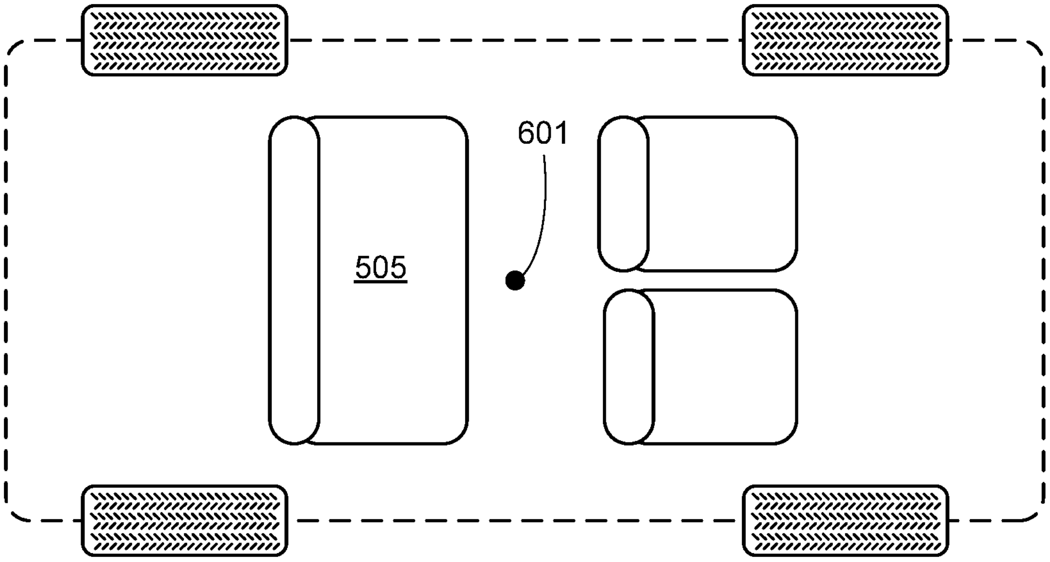
FIG. 6 provides a top view of a single sensor mounted in the vehicle's headliner.

Child/pet sensor or sensors 111 may be mounted in a variety of locations within the car, thus allowing sensor placement to be optimized for the passenger compartment and seat configuration of a particular car, as well as the selected type of sensor(s). FIGS. 2-4 provide side views of three exemplary mounting configurations suitable for use with a transducer-based detection system such as the preferred radar based transducer. In FIG. 2, transducers 201 and 203 are mounted to, or within, the vehicle's headliner 205. In FIG. 3, transducers 201 and 203 are mounted to, or within, the seat back 301 of seat 303, where seat 303 is the seat in front of monitored seat 305. In FIG. 4, transducers 201 and 203 are mounted to a display 401, for example a display used with a rear seat entertainment system. It should be understood that in order to monitor the entire rear seat, in some configurations and for some types of sensors it may be necessary to mount multiple sensors across the width of the car. For example, FIG. 5 provides a top view of the passenger cabin of a car 500, this view showing a pair of transducers 501 and 503 that are mounted adjacent to the left and right portions of rear seat 505, where the transducers are preferably mounted to, or within, the headliner. It will be appreciated that while two transducers are shown in each of these exemplary embodiments, the invention may use a single transducer or more than two transducers. For example, FIG. 6 provides a view similar to that of FIG. 5, except that a single transducer 601 is mounted to the headliner. Additionally, while the exemplary transducers are transceivers, as previously noted separate transmitter and receiver transducers may be used. Lastly, while the transducer locations shown in FIGS. 2-6 focus on monitoring the second row of seats where a child seat would normally be located, the invention is equally applicable to other transducer mounting locations that would allow other areas of the car, e.g., the front seats, to be monitored.

Figure 7:
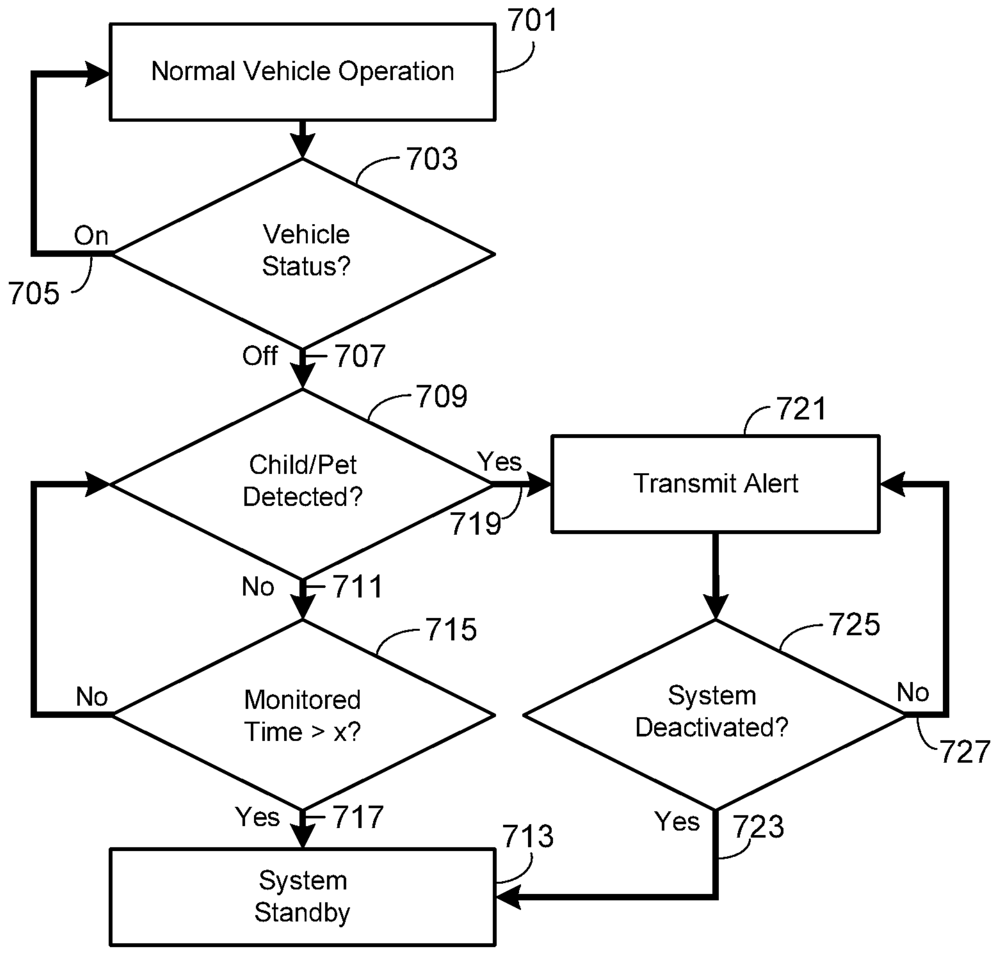
FIG. 7 illustrates the basic methodology of the invention.

FIG. 7 illustrates the basic methodology of the invention. During normal vehicle operation (step 701), controller 101 monitors vehicle status (step 703). Vehicle status may be determined by monitoring an on/off sensor 113. Sensor 113 may, for example, be coupled to the vehicle's ignition switch or the vehicle's on/off switch. As long as the status of the vehicle remains 'on' (step 705), controller 101 simply continues to perform monitoring step 703. Once controller 101 determines that the status of the vehicle has changed to 'off' (step 707), controller 101 initiates monitoring of the child/pet sensor 111 (step 709). It will be appreciated that other indicators may be used by controller 101 to switch the vehicle's status from 'on' to 'off'.

During monitoring step 709, controller 101 monitors the output from sensor(s) 111. In one embodiment, if no child (or pet) is detected (step 711) the system immediately enters into standby mode (step 713). The vehicle's standby mode may be configured in a variety of ways, depending upon the design objectives of the manufacturer. In some configurations, in standby mode the child detection system is turned-off, thereby minimizing off-line power consumption. In other configurations, and as described in detail below, in standby mode the child detection system is used in a theft-prevention mode, thus helping to prevent vehicle break-ins or at least minimize theft after a vehicle break-in.

While the system may be configured to immediately enter into stand-by mode if no child or pet is detected in step 711 as described above, preferably as shown in FIG. 7 the system is configured to monitor sensor 111 for a period of time, as provided by a timer 115, prior to making this determination (step 715). A typical period of time used in step 715 is less than 30 minutes, preferably less than 15 minutes, and more preferably in the range of 5 to 10 minutes. It should be understood, however, that a shorter period of time or a longer period of time may be used during this step. If no child or pet is detected (step 711) and the time allotted for detection is reached (step 717), then the system enters into standby mode (step 713), where the standby mode is as described above. If, however, a child or pet is detected (step 719), then controller 101 activates a warning or alert system (step 721).

The warning/alert system activated in step 721 may take any of a variety of forms as described in detail below, and may be intended to alert any of a variety of parties as to the detection of an unattended child or pet. Suitable parties to receive such a warning include the car's driver or owner, third parties that are in close proximity to the car (e.g., pedestrians near the car or people in nearby buildings), third parties under contract to monitor the vehicle's detection system (e.g., vehicle manufacturer or an alarm monitoring company), and/or emergency/health officials (e.g., police, paramedics, fire department). Examples of alarms that may be used by controller 101 to alert a nearby person of the unattended child or pet include both externally audible alarms 117 (e.g., car horn, on-board siren) and externally visible alarms 119 (e.g., internal and/or external car lights). In order to alert parties that are not in the immediate vicinity of the car, controller 101 uses a wireless telecommunication link 121 to send an appropriate alert message. The eCall system used in Europe is an example of such an automated emergency messaging service. Telecommunications link 121 may utilize any of a variety of different standards and protocols including, but not limited to, GSM, EDGE, UMTS, CDMA2000, DECT, WiFi and WiMax. The alert message may be in the form of a pre-recorded audible message that may, for example, be stored in memory 105. Alternately or in conjunction with the pre-recorded audible message, a preset text alert may be transmitted via communications link 121. The audible or textual message may also be sent via an application on the user's phone or other device. Alternately or in conjunction with the pre-recorded audible message and/or preset text alert, controller 101 may transmit a picture or video captured using an in-cabin camera 123, where the picture or video is of the inside of the passenger cabin in general, and preferably of the detected child or pet in particular.

Once the alert system has been activated (step 721), preferably the system continues to transmit an alert of one form or another until the system has been deactivated (step 723). In the procedure illustrated in FIG. 7, the system can be configured to deactivate once the status of the vehicle switches from 'off' to 'on'. Alternately or in addition to this form of deactivation, controller 101 can monitor the car doors with door sensors 127 and deactivate the alert system when a car door is opened. It will be appreciated that other means may be used to deactivate the alert system once it has been activated.

Figure 8:
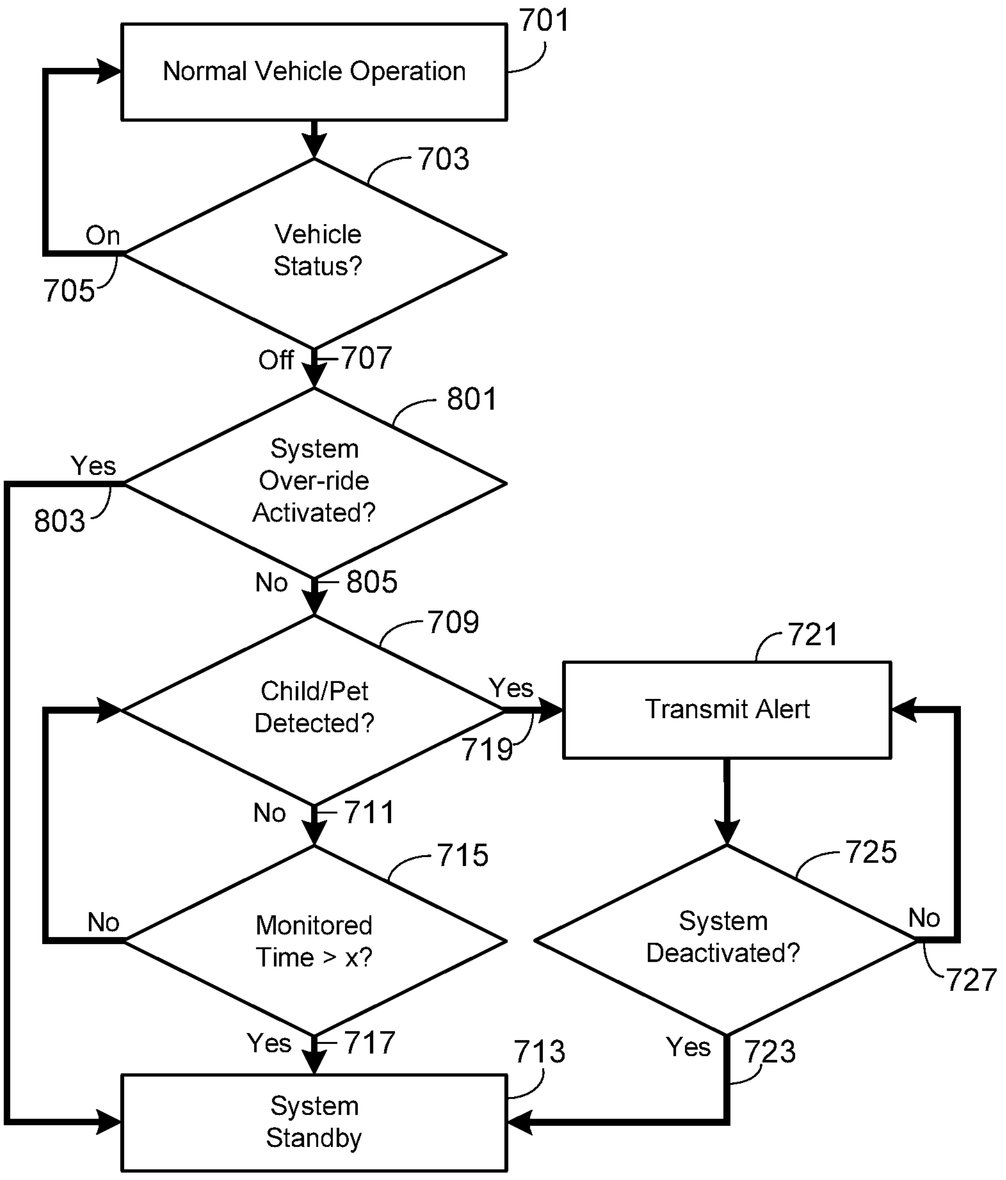
FIG. 8 illustrates a modification of the methodology shown in FIG. 7 that includes a system over-ride feature.

In some situations, the driver may wish to park their car, turn off the power to the car (i.e., ignition or power off), and sit with their child or pet. For example, the child may be napping and the parent or caregiver does not wish to wake the child. In this situation the methodology shown in FIG. 7 would issue an alert (step 721) even though the child was not in danger and the parent/caregiver was in attendance. A work-around for this situation is to provide a child detection system on/off switch, preferably accessible through user interface 109, as illustrated in FIG. 8. As shown, in addition to checking vehicle status (step 703), controller 101 also checks to see if the system over-ride has been activated (step 801). If the system over-ride has been activated (step 803), the controller immediately enters the standby mode (step 713). If the system over-ride has not been activated (step 805), the controller initiates monitoring for unattended children/pets using sensor 111 (step 709). In this embodiment once the alert system has been activated (step 721), preferably the user can deactivate the system (step 723) using the system over-ride. Additionally, the system can be configured to deactivate once the status of the vehicle switches from 'off' to 'on', and/or when controller 101 determines that a car door has been opened.

Figure 9:
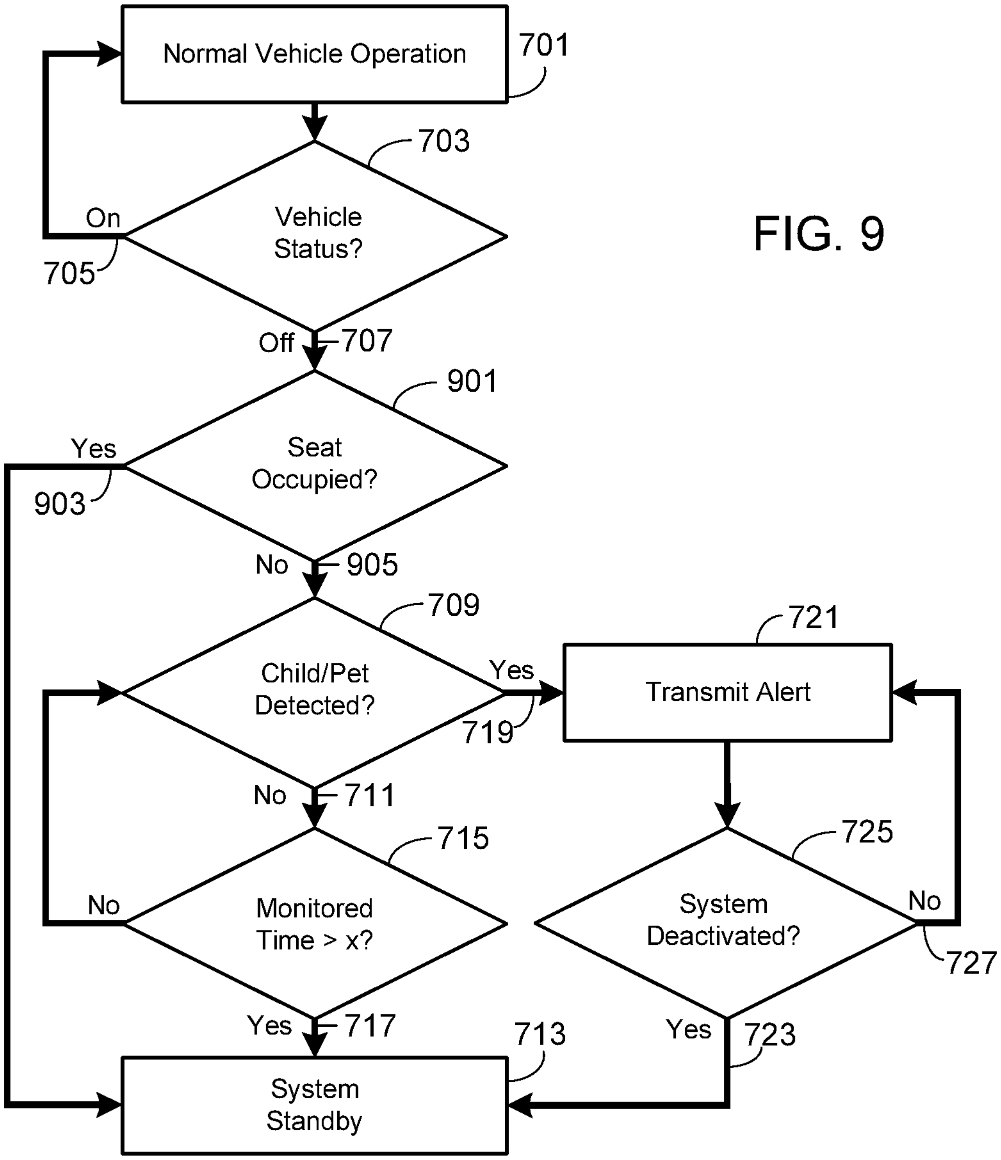
FIG. 9 illustrates a modification of the methodology shown in FIG. 8 in which activation of the system over-ride feature is based on whether or not the front vehicle seat(s) is occupied.
Figure 10:
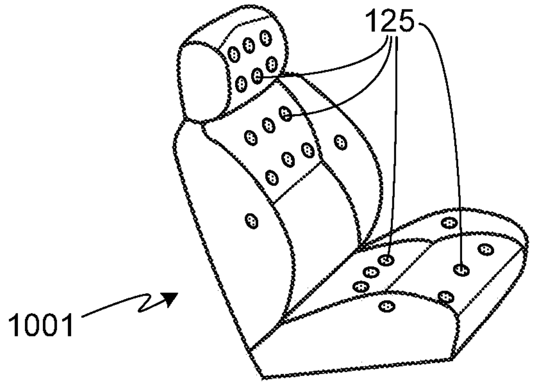
FIG. 10 illustrates the use of sensors within a vehicle seat.
Figure 11:
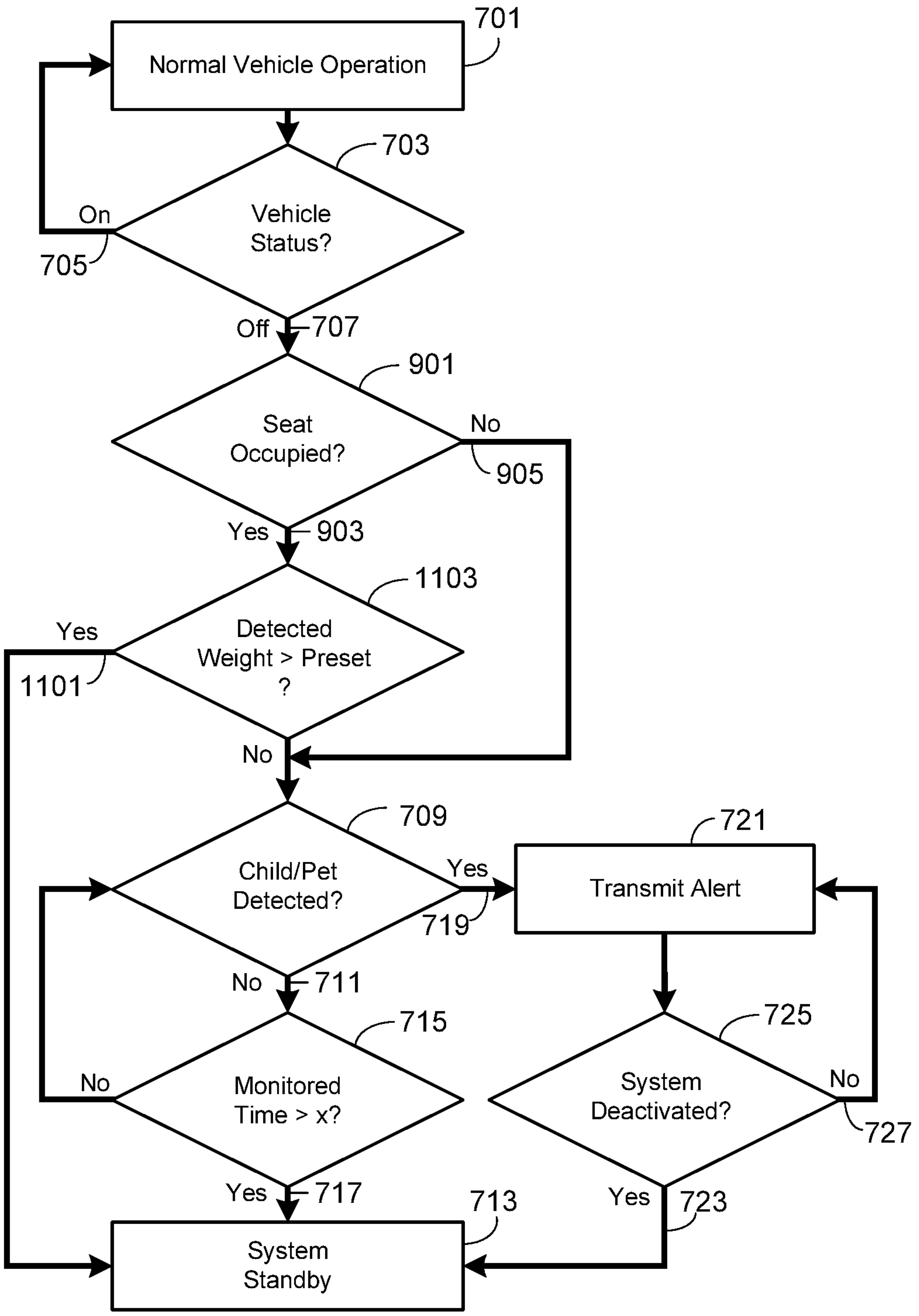
FIG. 11 illustrates a modification of the methodology shown in FIG. 8 in which activation of the system over-ride feature is based on whether or not the front vehicle seat(s) is occupied and if occupied, the weight of the occupying party.

While switching the child detection system off via the user interface as shown in FIG. 8 is one approach to over-riding the system, it should be understood that there are other approaches that may be used to initiate a system over-ride. For example in the process shown in FIG. 9, controller 101 monitors an occupant detection sensor, for example one or more sensors 125 located in the driver's seat, or located in both front vehicle seats (step 901). Sensors 125 may be pressure-based sensors or capacitance-based sensors. FIG. 10 illustrates the inclusion of sensors 125 in a vehicle seat 1001. If the output from sensor 125 indicates the presence of someone in the driver's seat (step 903) (or the presence of someone in the front passenger seat if the system is configured to monitor both front seats), then the controller immediately enters the standby mode (step 713). If the output from sensor 125 indicates the front seat(s) is vacant (step 905), then controller 101 initiates the monitoring sequence (step 709). It will be appreciated that if sensors 125 are pressure sensitive, the sensors may be calibrated as illustrated in FIG. 11, thereby allowing the system to only be over-ridden if the pressure sensitive seat sensors detect weight above a preset value (step 1101). By factoring in weight, the child detection system can be configured to operate even if a small weight, such as that of a small pet, is detected. Preferably in this embodiment the user is able to set the cut-off weight used in step 1103, for example using interface 109, thus allowing the user to configure the system for their particular pet or situation. In the embodiments shown in FIGS. 9 and 11, preferably the system is configured so that once the alert system has been activated (step 721), the user can deactivate the system (step 723) by opening a car door, and/or switching the vehicle from 'off' to 'on', and/or seating in a car seat, thereby over-riding the system.

Figure 12:
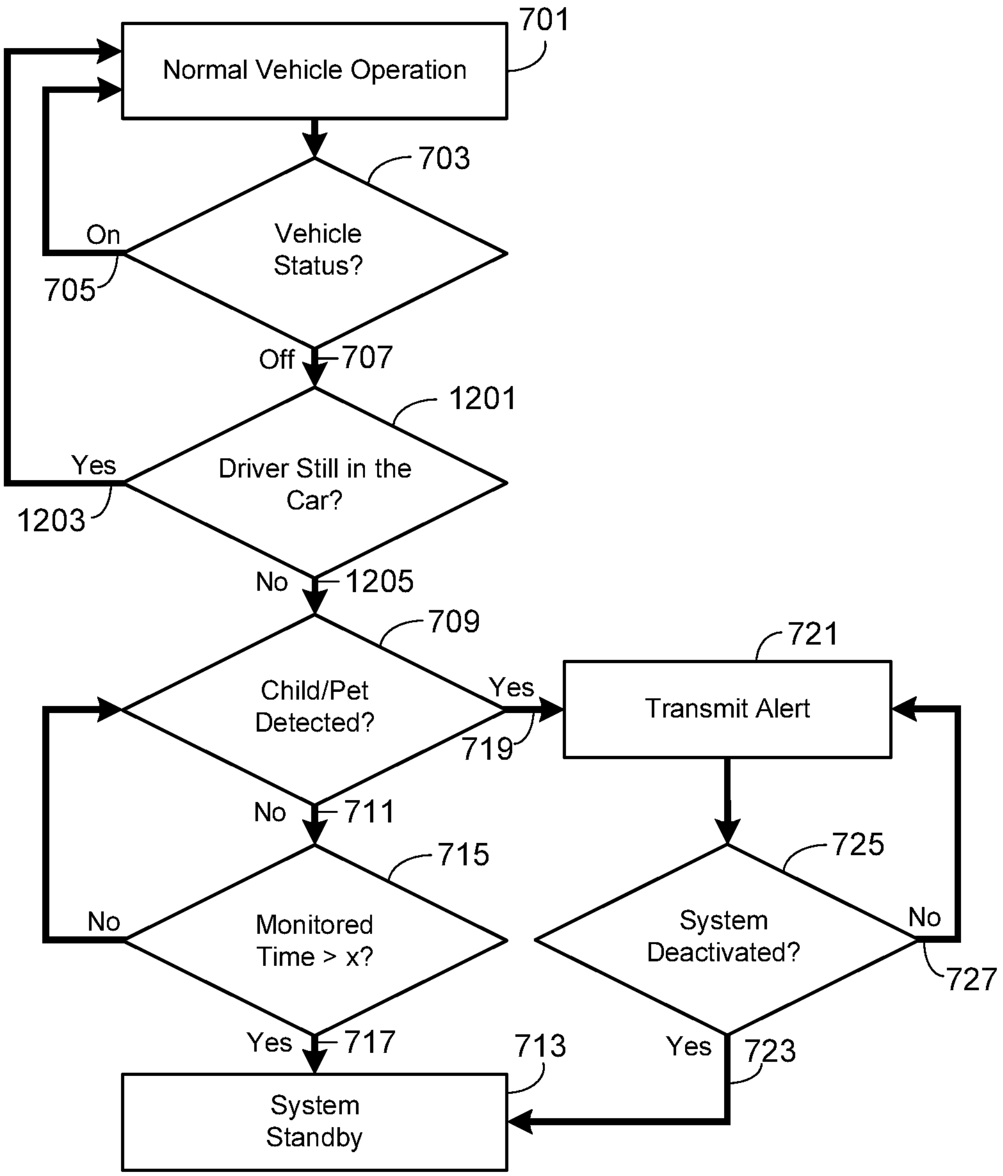
FIG. 12 illustrates a modification of the methodology shown in FIG. 8 in which activation of the system over-ride feature is based on whether or not the driver remains in the car once the vehicle has been turned off.

FIG. 12 illustrates another modification of the basic methodology shown in FIG. 7, the modified methodology including an alternate technique for determining whether or not to activate the system's child detection sensor. In this embodiment in addition to determining vehicle status (step 703) as described above, the controller also determines whether or not the driver has left the car (step 1201). Preferably controller makes this determination without any aid from the driver, i.e., preferably the driver is not required to switch the child detection system on or otherwise indicate that they are leaving the car. In the preferred approach, controller 101 monitors driver proximity to the vehicle in order to determine whether or not the driver has left the car.

In the procedure illustrated in FIG. 12, controller 101 determines driver proximity by monitoring the driver's key fob. Alternately, the system can be configured to identify and track the driver based on the user's smartphone or another device with a unique user identifier. Preferably controller 101 tracks the location of the driver's key fob or other uniquely identifiable device (e.g., smartphone) using communication link 121 and a short range wireless technology such as a radio-frequency identification (RFID) system or a Bluetooth wireless system. As long as the driver remains in the car (step 1203), the child detection system remains inactive. Once the driver leaves the car (step 1205) as determined by controller 101, then the controller initiates monitoring for unattended children/pets using sensor 111 (step 709). It should be understood that the order of steps 703 and 1201 may be reversed.

Figure 13:
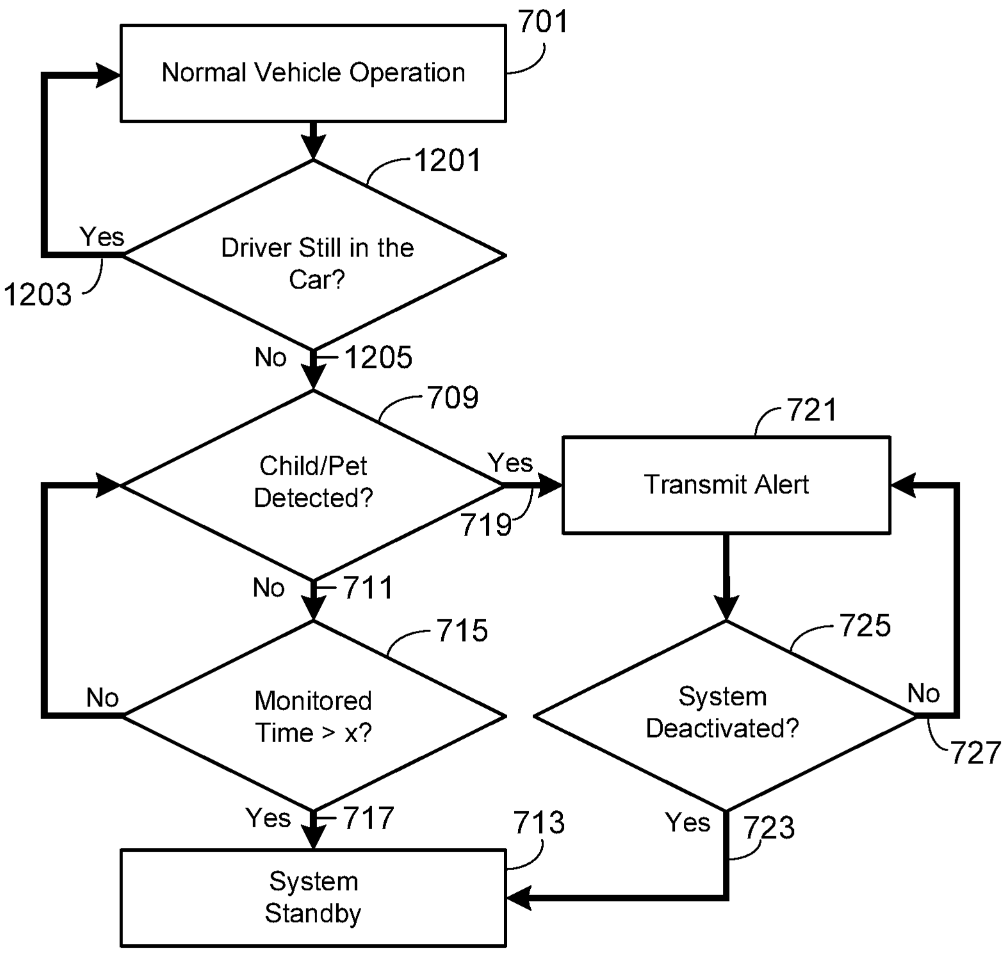
FIG. 13 illustrates a modification of the methodology shown in FIG. 12 in which activation of the child detection system is based solely on proximity of the driver to the car.

FIG. 13 illustrates a simplification of the procedure shown in FIG. 12. The illustrated method assumes that if the driver has left the car, as evidenced by the driver's key fob or similar uniquely identifiable device moving out and away from the car, then the status of the car must be 'off'. Therefore once the driver leaves the car (step 1205), the system activates child/pet detection sensor 111 and begins the monitoring procedure as described above. In the embodiments shown in FIGS. 12 and 13, preferably the system is configured to allow system deactivation, once the alert system has been activated (step 721), by returning the driver's key fob (or similar uniquely identifiable device) to the car, and/or opening a car door, and/or switching the vehicle from 'off' to 'on'.

Regardless of the embodiment, once controller 101 determines that a child or pet has been left unattended in the car (step 719), the system can be configured to activate any of a variety of different alerts (e.g., audible, visual, textual, phone-based, etc.) that are intended to notify any of a variety of different parties of the unattended child/pet (e.g., parties in proximity to the car, parties not in the immediate vicinity, emergency/health officials, etc.). In the preferred embodiment, the system is configured to automatically vary the alert mode, i.e., the selected alert, based upon how long the child or pet has been left unattended in the car. The intent of this approach is to decrease the risk of injury or death of the unattended child or pet by quickly escalating the type of alert from one intended to warn an individual or a relatively small group of individuals to one intended to alert a much larger group and/or an emergency service. Thus as shown in the exemplary embodiment of FIG. 14, after the alert is initially transmitted (step 721), and assuming that the system is not deactivated in step 725, then controller 101 compares the elapsed time since the alarm was activated to a preset value, y (step 1401). The preset value is preferably set by the manufacturer, although the system may be configured to allow this value to be set by the end user or a third party. As long as the elapsed time remains below this preset value (step 1403) and the system is not deactivated (step 727), the system continues to transmit the initially transmitted alert. Once the elapsed time exceeds the preset value (step 1405), and assuming that the system has not been deactivated, the alert mode is altered (step 1407) and the preset time value used in step 1401 is increased (step 1409). This loop continues, increasing the alert until the system is deactivated. It should be understood that while this mode of escalating alerts is shown relative to the basic methodology of FIG. 7, it is equally applicable to the other embodiments of the invention (e.g., the embodiments shown in FIGS. 8, 9, 11-13).

Figure 14:
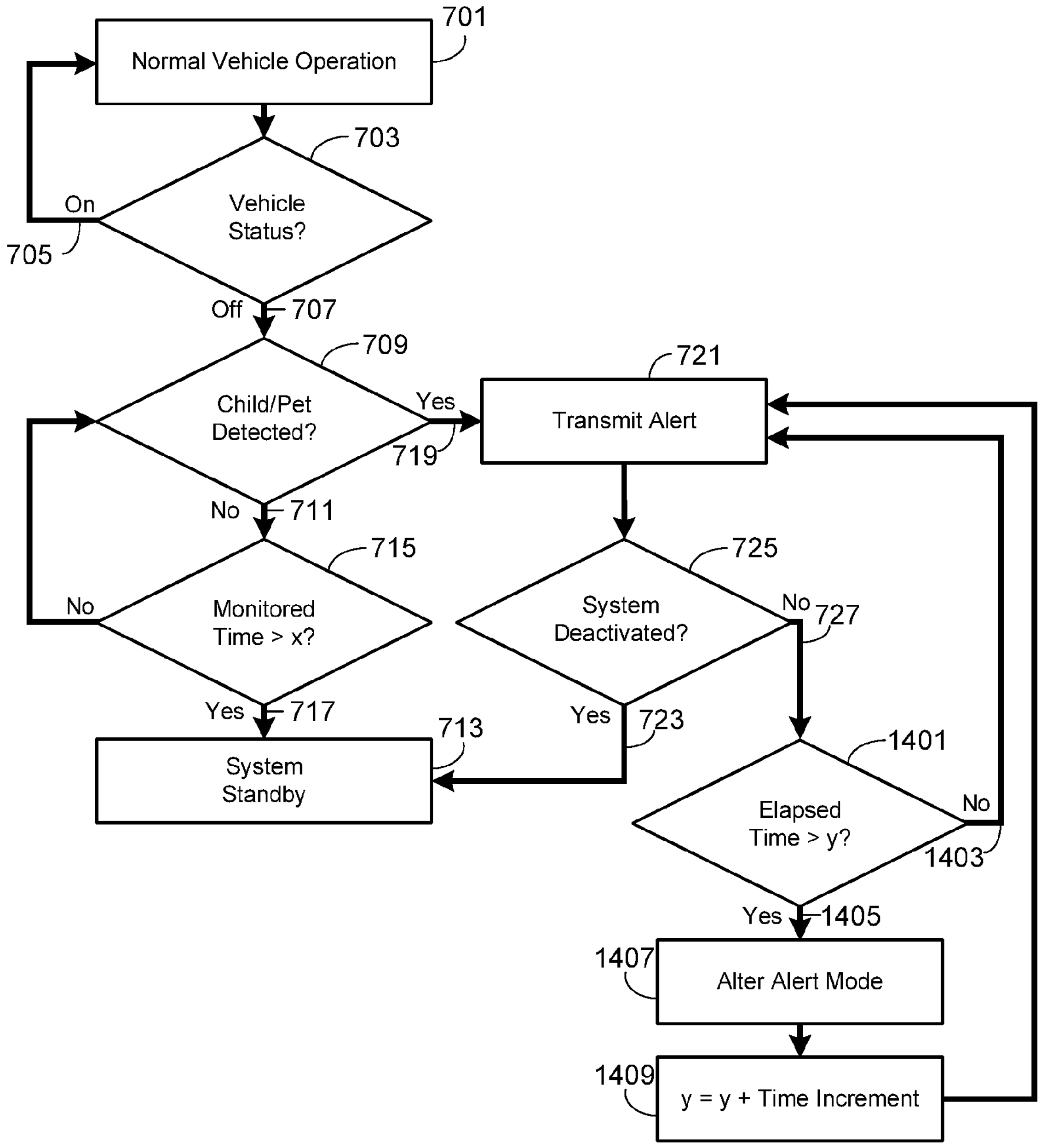
FIG. 14 illustrates a modification of the methodology shown in FIG. 7 in which the type of alert varies over time after an unattended child or pet has been detected by the system.

While the type of alert issued by controller 101 in step 721 can take any of the previously described forms, preferably in the methodology illustrated in FIG. 14 the initially issued alert is sent to the driver. This initial alert may be in the form of a text message and/or a pre-recorded audible message and/or a smart device (e.g., phone) application push. The initial alert may be accompanied by an image (e.g., photo) of the interior of the passenger cabin taken by camera 123, the image preferably including the unattended child or pet. If the driver does not immediately return and deactivate the system, once the elapsed time exceeds the preset time (e.g., after a relatively short time period of a few minutes), the controller alters the alert mode. Preferably the next alert mode is intended to alert nearby parties, i.e., people walking by the car or in nearby buildings. This next alert mode typically will sound the horn and/or flash the outside lights. If the system still remains active, once the elapsed time exceeds the next preset (e.g., typically after a few more minutes), then the controller will preferably alter the alert mode to initiate a call and send an audible and/or textual message to a private and/or public emergency center (e.g., alarm monitoring company, police, paramedics, fire department, etc.).

In addition to transmitting alerts, preferably controller 101 is configured to actively control the temperature within the vehicle using the car's HVAC system 129. If the system is configured to provide controller 101 with HVAC control, as preferred, then one of the alert modes set in step 1407 may be to initiate passenger cabin air circulation, thereby lowering cabin temperature by actively circulating in-cabin air with outside air. Depending upon vehicle and system configuration, during this step controller 101 may also be configured to turn on the vehicle's air conditioning system. When controller 101 is provided with HVAC system 129 control, preferably if the driver does not immediately return and deactivate the system after transmission of the initial alert, then once the elapsed time exceeds the first preset time period the controller will alter the alert mode (step 1407) to a mode in which the system attempts to maintain in-cabin air quality and temperature by activating HVAC system 129. Activation of the audible and/or visible alerts (e.g., horn and/or external flashing lights) may precede activation of the HVAC system, or may accompany activation of the HVAC system, or may be delayed until the next change in alert mode.

As described above relative to all embodiments, and as illustrated in the exemplary embodiment shown in FIG. 14, the system can be configured to alter the type of alert based on the amount of time that has elapsed since an unattended child or pet is first detected. In a modification of this approach that is illustrated in the exemplary embodiment shown in FIG. 15, and that is also applicable to all embodiments, the system can be configured to alter the type of alert based on in-cabin temperature. The benefit of this approach is that the rate of alert escalation is based directly on risk to the child (or pet) since it is based on in-cabin temperature. In contrast, the rate of alert escalation described above relative to FIG. 14 will vary at the same rate, regardless of in-cabin temperature. In the configuration shown in FIG. 15, controller 101 monitors an in-cabin temperature sensor 131.

Figure 15:
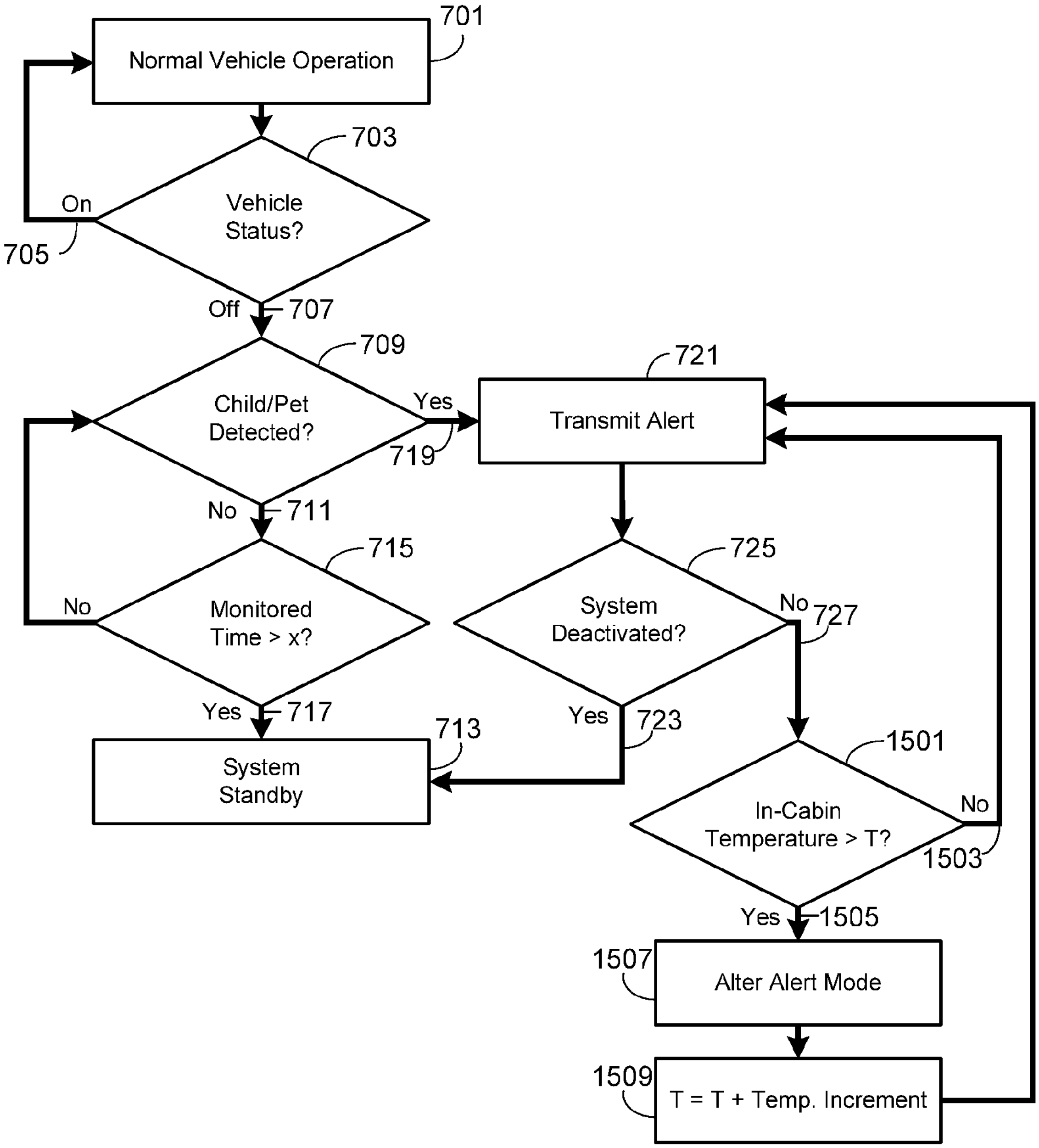
FIG. 15 illustrates a modification of the methodology shown in FIG. 7 in which the type of alert varies based on in-cabin temperature.

As shown in FIG. 15, after the alert is initially transmitted (step 721), and assuming that the system is not deactivated in step 725, then controller 101 compares the in-cabin temperature to a preset value, T (step 1501). As in the embodiment illustrated in FIG. 14, preferably the preset value is set by the manufacturer or an authorized third party. As long as the in-cabin temperature remains below this preset value (step 1503) and the system is not deactivated (step 727), the system continues to transmit the initially transmitted alert. Once the in-cabin temperature exceeds the preset value (step 1505), and assuming that the system has not been deactivated, the alert mode is altered (step 1507) and the value for the preset temperature is increased (step 1509). This loop continues, increasing the alert until the system is deactivated. This technique for altering the transmitted alert is applicable to all embodiments of the invention, even though it is shown relative to the basic methodology.

Figure 16:
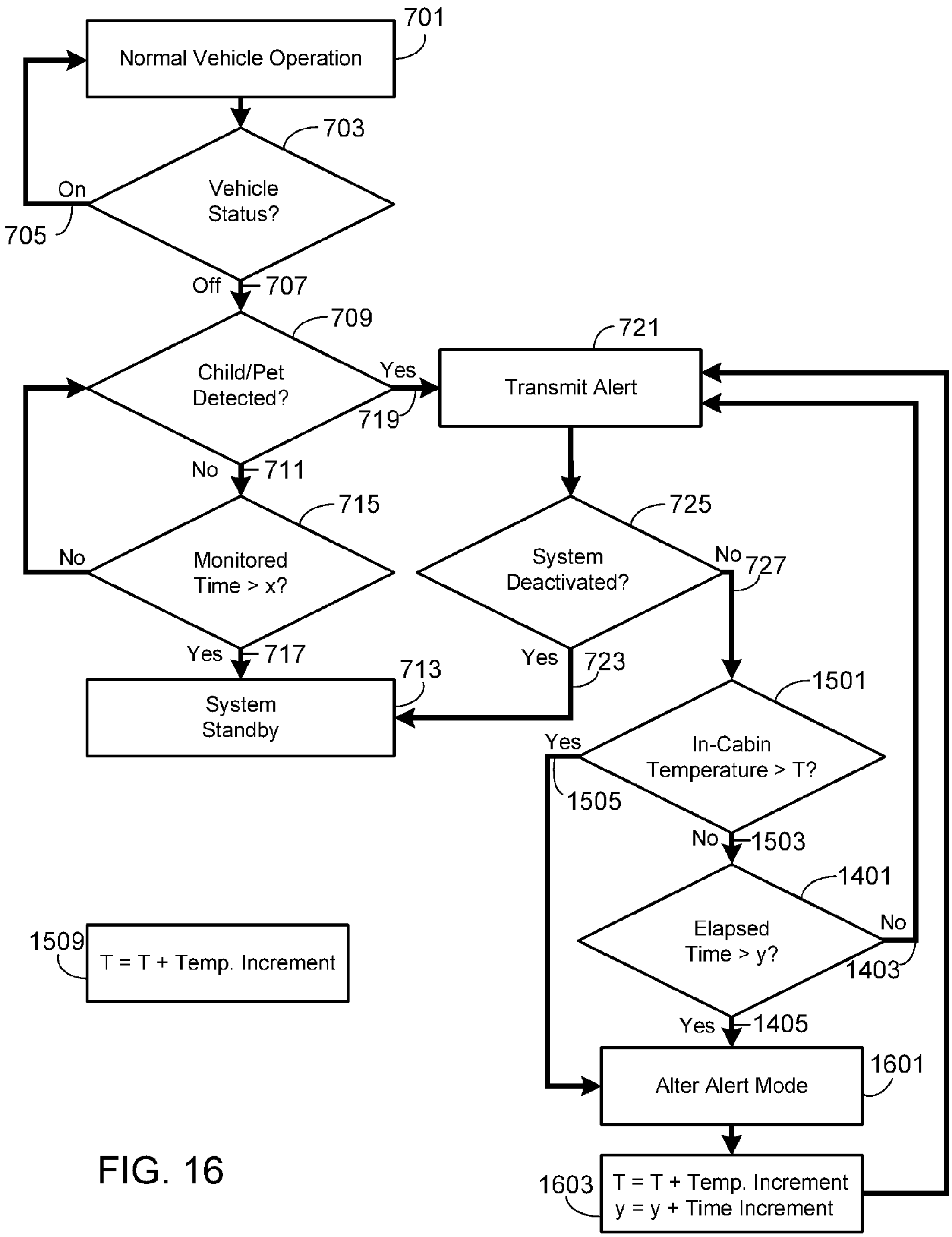
FIG. 16 illustrates a modification of the methodology shown in FIG. 7 in which the type of alert may vary based on either elapsed time or in-cabin temperature.

Since the health risks associated with heat exposure are based both on the exposure temperature and the length of exposure, in at least one embodiment and as illustrated in FIG. 16, the alert mode is altered based on the amount of time that has elapsed since an unattended child or pet is first detected (e.g., FIG. 14) as well as the in-cabin temperature (e.g., FIG. 15). As shown in FIG. 16, if the in-cabin temperature is less than the preset temperature, T (step 1503), then the system compares the elapsed time to a preset value, y (step 1401). If both the in-cabin temperature and the elapsed time are less than the corresponding presets, the system continues to transmit the current alert mode. If either the in-cabin temperature is greater than the preset temperature (step 1505), or the elapsed time is greater than the preset time value (step 1405), then the alert mode is altered (step 1601) and the values for the presets are increased (step 1603). This loop continues, increasing the alert mode until the system is deactivated. This technique for altering the mode of the transmitted alert is applicable to all embodiments of the invention, even though it is only shown relative to the basic methodology. It should be understood that the order of steps 1401 and 1501 may be reversed.

As previously noted, if a child or pet is not detected in step 709, either immediately or after a preset period of time has elapsed without child/pet detection, the system enters into a standby mode (step 713). The system can be configured such that in standby mode, the child/pet detection system is turned off, thus minimizing power consumption. The system can also be configured such that in standby mode, the child/pet detection system is incorporated into the vehicle's on-board security system. As used as part of the on-board security system, the sensitivity of sensor 111 may or may not be changed from the setting used when the sensor is operating as a child/pet sensor. Regardless of whether or not the sensor sensitivity is altered when operating in this mode, preferably the alert that is activated when a possible break-in is detected is different from that described above. When a break-in is detected, a typical vehicle security system will immediately attempt to get the attention of people passing, for example by sounding the horn and/or flashing the lights. Additionally, this type of security system will often immediately notify the authorities and/or a private security company that is under contract to monitor the on-board system. A typical on-board security system will not, however, vary the alarm based on either elapsed time or in-cabin temperature.

Figure 17:
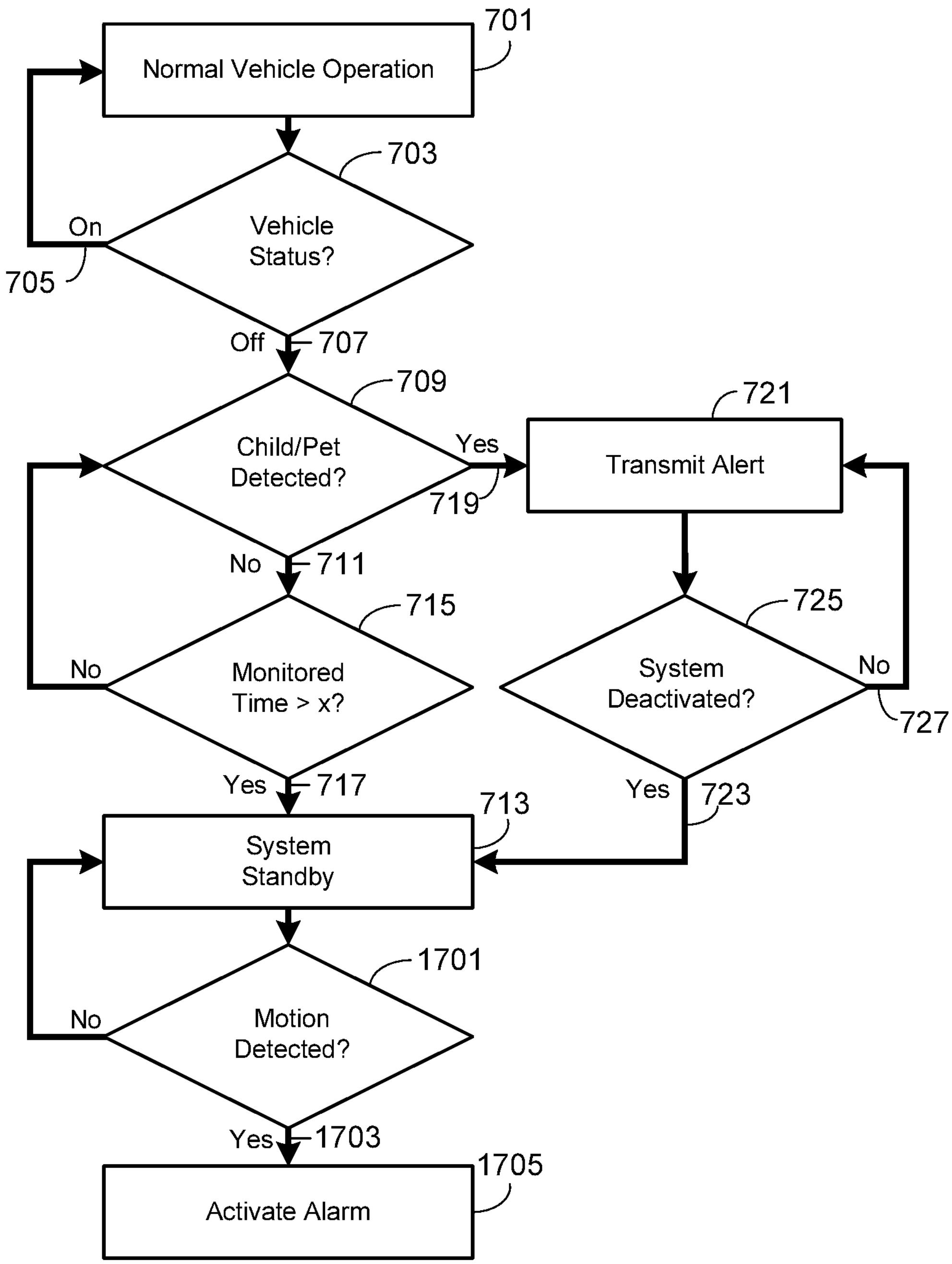
FIG. 17 illustrates a modification of the methodology shown in FIG. 7 that illustrates the use of the child/pet sensor in the vehicle's on-board security system.

FIG. 17 illustrates an embodiment, based on the methodology shown in FIG. 7, in which sensor 111 is incorporated into the vehicle's on-board security system whenever the system enters into standby mode (step 713). It should be understood that the child/pet detection of the invention may be incorporated into the vehicle's security system in any of the embodiments, i.e., those illustrated in FIGS. 7-9 and 11-16. As shown in FIG. 17, once the system enters into standby mode (step 713), controller 101 continues to monitor sensor 111 (step 1701). If sensor detects motion (step 1703), controller 101 activates a preconfigured alarm (step 1705). The preconfigured alarm activated in step 1705 may use an audible alarm 117, a visible alarm 119, and/or a message sent via communication link 121. The system may also use camera 123 to send an interior image of the passenger cabin via communication link 121.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A child detection system incorporated into a vehicle, comprising:

a radar sensor mounted within a passenger cabin of said vehicle and configured to detect motion within said passenger cabin;

a monitoring system, wherein said monitoring system outputs a first control signal when a driver of said vehicle exits said passenger cabin, and wherein said monitoring system outputs a second control signal when said driver re-enters said passenger cabin;

an alert system configured to output an alert, said alert utilizing an alert mode selected from a plurality of alert modes; and a control system coupled to said radar sensor and to said monitoring system and to said alert system, said control system configured to activate said radar sensor when said control system receives said first control signal, said control system configured to monitor said radar sensor for a preset period of time after receipt of said first control signal, said control system configured to activate said alert system when said radar sensor detects motion within said passenger cabin during said preset period of time, said control system configured to select said alert mode for said alert output by said alert system, said control system configured to alternate said alert mode selected for said alert over time from said plurality of alert modes, said control system configured to deactivate said alert system upon receipt of said second control signal; and a system over-ride switch, said system over-ride switch comprising at least one pressure-based sensor integrated into a driver seat of said vehicle, wherein a cut-off weight corresponding to said at least one pressure-based sensor is settable by a user via a user interface, wherein said system over-ride switch is activated when a pressure applied to said at least one pressure-based sensor corresponds to a first weight greater than said cut-off weight, and wherein said system over-ride switch is not activated when said pressure applied to said at least one pressure-based sensor corresponds to a second weight less than said cut-off weight, and wherein said control system is configured to not activate said radar sensor when said control system receives said first control signal if said system over-ride switch is activated.

2. The child detection system of claim 1, wherein said preset period of time is set at less than 30 minutes.

3. The child detection system of claim 1, further comprising a heating, ventilation and air conditioning (HVAC) system, said control system coupled to said HVAC system, said control system configured to activate said HVAC system after said radar sensor detects motion within said passenger cabin during said preset period of time.

4. The child detection system of claim 1, further comprising a timer coupled to said control system, said control system configured to alternate said alert mode selected for said alert based on an elapsed time since activation of said alert system.

5. The child detection system of claim 4, further comprising a heating, ventilation and air conditioning (HVAC) system, said control system coupled to said HVAC system, said control system configured to activate said HVAC system after said elapsed time exceeds a preselected time period.

6. The child detection system of claim 1, further comprising a temperature sensor mounted within said passenger cabin, said temperature sensor coupled to said control system, said control system configured to alternate said alert mode selected for said alert based on a monitored in-cabin temperature.

7. The child detection system of claim 6, further comprising a heating, ventilation and air conditioning (HVAC) system, said control system coupled to said HVAC system, said control system configured to activate said HVAC system after said monitored in-cabin temperature exceeds a preset temperature.

8. The child detection system of claim 1, said control system configured to place said radar sensor into a standby mode if said radar sensor does not detect motion within said passenger cabin during said preset period of time.

9. The child detection system of claim 8, wherein said control system deactivates said radar sensor when said radar sensor is placed into said standby mode.

10. The child detection system of claim 8, wherein said radar sensor is incorporated into a vehicle on-board security system when said radar sensor is placed into said standby mode.

11. The child detection system of claim 10, said control system configured to activate an alarm when said radar sensor detects motion within said passenger cabin after said preset period of time has elapsed and said radar sensor is in said standby mode.

12. The child detection system of claim 1, said plurality of alert modes including at least one externally audible alarm and at least one externally visible alarm.

13. The child detection system of claim 1, said alert system further comprising a wireless telecommunications link, wherein said plurality of alert modes includes a pre-recorded message, said pre-recorded message selected from a pre-recorded text message and a pre-recorded audible message, wherein said alert system transmits said pre-recorded message using said wireless telecommunications link when said radar sensor detects motion within said passenger cabin during said preset period of time.

14. The child detection system of claim 1, further comprising an in-cabin camera and a wireless telecommunications link, wherein said alert system transmits a current image of said passenger cabin using said wireless telecommunications link when said radar sensor detects motion within said passenger cabin during said preset period of time.

15. The child detection system of claim 1, further comprising a vehicle status sensor coupled to said control system, said vehicle status sensor outputting an off control signal when said vehicle is in an off state, said vehicle status sensor outputting an on control signal when said vehicle is in an on state, said control system configured to activate said radar sensor when said control system receives said first control signal from said monitoring system and said off control signal from said vehicle status sensor, and said control system configured to monitor said radar sensor for said preset period of time after receipt of said first control signal from said monitoring system and said off control signal from said vehicle status sensor.

16. The child detection system of claim 1, said monitoring system further comprising a wireless telecommunications link, wherein said monitoring system outputs said second control signal when said wireless telecommunications link establishes a short range link between a remote device and said system controller, and wherein said monitoring system outputs said first control signal when said short range link between said remote device and said system controller is lost.

17. The child detection system of claim 1, said monitoring system further comprising a short range wireless identification system, wherein said monitoring system outputs said second control signal when said short range wireless identification system identifies a device with a unique user identifier and determines said device is within said passenger cabin, and wherein said monitoring system outputs said first control signal when said short range wireless identification system determines said device is outside of said passenger cabin.

18. The child detection system of claim 17, wherein said device is a key fob.

19. The child detection system of claim 1, said control system configured to deactivate said alert system when said system over-ride switch is activated.

20. The child detection system of claim 1, said radar sensor mounted to a headliner of said passenger cabin.

* * * * *